(12) United States Patent
Ishikawa (10) Patent No.: US 7,195,263 B2
(45) Date of Patent: Mar. 27, 2007

(54) VEHICLE FRAME STRUCTURE

(75) Inventor: Yuzuru Ishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/076,778

(22) Filed: Mar. 10, 2005

(65) Prior Publication Data

US 2005/0236204 A1    Oct. 27, 2005

(30) Foreign Application Priority Data

Mar. 23, 2004    (JP)    ............................ 2004-084541

(51) Int. Cl.
*B62K 11/02*    (2006.01)
(52) U.S. Cl. ....................... 280/219; 280/209; 280/210
(58) Field of Classification Search ................ 180/219, 180/209, 210
See application file for complete search history.

(56) References Cited

U.S. PATENT DOCUMENTS

| | | | | |
|---|---|---|---|---|
| 4,537,273 | A | * | 8/1985 | Funabashi .................... 180/229 |
| 4,585,086 | A | | 4/1986 | Hiramatsu et al. |
| 4,678,054 | A | | 7/1987 | Honda et al. |
| 4,727,953 | A | | 3/1988 | Kudo et al. |
| 4,887,687 | A | * | 12/1989 | Asai et al. .................... 180/219 |
| 5,054,571 | A | * | 10/1991 | Takasaka ..................... 180/219 |
| 6,502,658 | B1 | | 1/2003 | Nagashii |
| 6,846,018 | B2 | * | 1/2005 | Dennert et al. .............. 280/785 |
| 6,964,314 | B1 | * | 11/2005 | Vey .............................. 180/209 |
| 6,969,083 | B2 | * | 11/2005 | Egan ............................ 280/291 |
| 2002/0189877 | A1 | * | 12/2002 | Yagisawa et al. ............ 180/219 |
| 2004/0200312 | A1 | * | 10/2004 | Buckhouse et al. ............ 74/564 |
| 2004/0238254 | A1 | * | 12/2004 | Iwata et al. .................. 180/219 |
| 2005/0006162 | A1 | * | 1/2005 | Philipps et al. .............. 180/219 |
| 2005/0029032 | A1 | * | 2/2005 | Kudo et al. .................. 180/219 |
| 2005/0082100 | A1 | * | 4/2005 | Sakaki et al. ................ 180/219 |
| 2005/0253359 | A1 | * | 11/2005 | Egan ........................ 280/304.3 |

FOREIGN PATENT DOCUMENTS

| | | |
|---|---|---|
| DE | 39 31 478 | 4/1991 |
| EP | 0247902 | 12/1987 |
| EP | 1230994 | 8/2002 |
| GB | 630558 | * 10/1949 |

(Continued)

*Primary Examiner*—Lesley D. Morris
*Assistant Examiner*—Marlon Arce-Diaz
(74) *Attorney, Agent, or Firm*—Carrier, Blackman & Associates, P.C.; William D. Blackman; Joseph P. Carrier (57) ABSTRACT

A vehicle frame structure includes a pair of main frames, one of the pair of frames extending on left side of a vehicle, and the other on the right side, from the head pipe rearwards in an overall sealed cross sectional structure. At least a portion of each main frame includes a frame upper stage and a frame lower stage, each stage made up of a closed, sealed cross sectional structure. At least a portion of each main frame further includes an outer plate and an inner plate joined into an integrated piece with the frame upper stage and the frame lower stage. The plates are installed so as to extend over both sides of the frame upper stage and the frame lower stage. The frame structure provides a well-balanced high-strength main frame, and high strength in portions which join the main frame and head pipe.

20 Claims, 6 Drawing Sheets

FOREIGN PATENT DOCUMENTS

| | | |
|---|---|---|
| JP | 61 202990 A | 9/1986 |
| JP | 61 202992 A | 9/1986 |
| JP | 301485 | 12/1989 |
| JP | 05-178252 | 7/1993 |
| JP | 08 290790 | 11/1996 |
| JP | 2000272569 A | 10/2000 |
| WO | WO 03057552 | 7/2003 |

* cited by examiner

VEHICLE FRAME STRUCTURE

CROSS-REFERENCE TO RELATED APPLICATIONS

The present invention claims priority under 35 USC 119 based on Japanese patent application No. 2004-084541, filed on Mar. 23, 2004. The subject matter of this priority document is incorporated by reference herein.

BACKGROUND OF THE INVENTION

1. Field of the Invention

The present invention relates to a vehicle frame structure, and particularly to a vehicle frame structure for motorcycles.

2. Description of the Background Art

As conventionally provided in motorcycles, the vehicle main frame structure comprises a front half of the frame joined to a head pipe for supporting the front wheel to allow steering, and a rear half of the frame joined to a center frame for supporting the rear wheel via the swing arm. A main frame structure of this type is disclosed in JP-A No. 272569/2000. As disclosed in this document, the front half and rear half of the frame are made up of separate materials and provide a well-balanced, high-strength main frame while limiting the weight of the main frame.

Although the rear half of the main frame structure described in JP-A No. 272569/2000 is designed for comparatively low strength, in order to reduce weight, absorb shocks and achieve flexibility, the front half of the main frame is usually designed for comparatively high strength. The front half of the main frame requires high strength in order to boost bending and flexibility strength against input from the steering system. Main frames with a good balance of strength are in increasingly high demand to keep pace with high performance vehicles appearing in recent years. Along with this demand, greater strength is also desired in the portion of the frame joining the main frame and head pipe.

In view of this desideratum, the present invention provides a vehicle frame structure with a good balance of high strength in the main frame, as well as high strength in the portion of the frame joining the main frame and head pipe.

SUMMARY OF THE INVENTION

According to one aspect of the present invention, there is provided a vehicle frame structure comprising a pair of main frames extending longitudinally rearwards from the head pipe on both the left and right sides of the vehicle. At least a portion of each main frame includes a first pipe and a second pipe containing respective closed, sealed cross sectional structures. At least a portion of each main frame also includes a pair of plate members integrated into one piece with each pipe section, and installed to extend over each pipe section forming respective structures having a closed, sealed cross section.

According to a second aspect of the invention, the first pipe and the second pipe are installed in vertical alignment, and the plate members are installed on each of the inside and the outside of the vehicle, respectively. In each main frame, the resulting main frame portion includes each pipe and each plate member forming a closed, sealed cross sectional structure. The structure comprises: a pair of side walls corresponding to the sides of each pipe and each plate member and, an upper wall defined by the top of the first pipe, as well as a bottom wall defined by the bottom of the second pipe.

The structure further includes an upper stage reinforcing wall defined by the bottom of the first pipe, and a lower stage reinforcing wall defined by the top of the second pipe. The reinforcing walls extend between the interior surfaces of the sidewalls within the closed, sealed cross sectional structure.

In other words, according to another aspect of the present invention, sections comprised of the pipes and the plate members of each main frame form a closed, sealed three-layer box shaped cross sectional structure. The structure includes a pair of reinforcing walls (as a non-limiting example, in the embodiments disclosed herein, an upper stage reinforcing wall 78 and a lower stage reinforcing wall 79) extending between both side walls (as a non-limiting example, in the embodiments disclosed herein, a frame outer side wall 74 and a frame inner side wall 75).

A main frame with a good balance of high strength can be attained by forming the desired section on each main frame into a sealed structure with a three-layer box shaped cross section. By utilizing this structure wherein the main frame is a sealed structure with a comparatively long vertical 3-layer box shape, the width of the vehicle can also be limited and the strength maintained.

According to another aspect of the present invention, at least the portions of each main frame joining the head pipe are made of a sealed structure with the three-layer box shaped cross section, and the total circumference, and each reinforcing wall are joined to form one integrated piece with the head pipe.

Here, when joining (welding) both the total circumference of each main frame and the internal reinforcing walls to the head pipe, each plate member may be joined to each pipe and the head pipe after first joining that pipe to the head pipe along its total circumference. In other words, the total circumference of each pipe and each plate member is welded to the head pipe.

Therefore, along with improving the strength of the sealed structure with a three-layer box shaped cross section for the front main frames, the strength of the section joining each main frame and head pipe is also improved.

Here, by welding each pipe in a pipe shape to match the vehicle on left and right sides, a greater degree of freedom is obtained in setting the main frame strength, compared to when forming an already existing material into a pipe shape. As a result, manufacture of the frame becomes relatively easy.

In the invention, the second (lower) pipe of each main frame also functions as an engine hanger (as a non-limiting example, in the embodiments disclosed herein, an engine hanger 34). The rear portion of the first (upper) pipe may be connected to the swing arm pivot (as a non-limiting example, in the embodiments disclosed herein, the center frame 8) to efficiently reduce the number of parts in the vehicle frame.

According to still another aspect of the invention, each plate member is installed on the front half (as a non-limiting example, in the embodiments disclosed herein, the front half section 51) of the main frame, from the head pipe to the engine mount section (as a non-limiting example, in the embodiments disclosed herein, the front engine mount 69) so that the front section is made higher in strength than the engine mount section when not reinforced by the engine.

The present invention attains high vehicle performance with a good balance of strength on each main frame. The strength in each main frame is maintained while achieving a compact chassis. The present invention attains high strength in the front half section of each main frame while increasing the strength in the section joining the head pipes with each main frame. The present invention increases the degree of freedom for setting the main frame strength and makes manufacture relatively easy, reduces the vehicle weight and cost by efficiently reducing the number of vehicle frame parts, and achieves a high strength main frame with good efficiency.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE INVENTION

The embodiments of the present invention are herewith described while referring to the accompanying drawings. Unless indicated otherwise in the following description, the front/rear/left/right directions correspond to the directions seen by an operator riding the vehicle.

Figure 1:
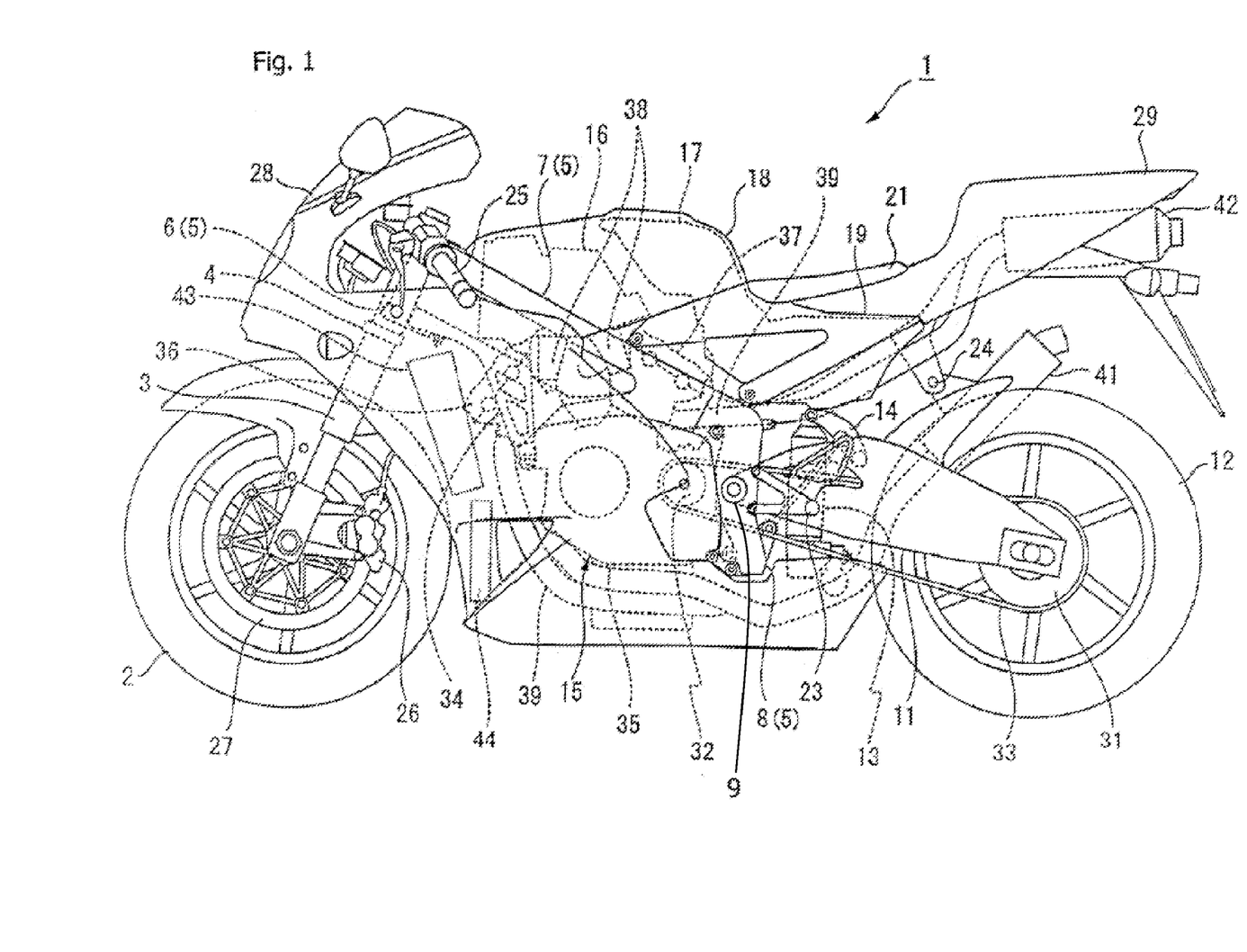
FIG. 1 is a side view of the motorcycle of the embodiment of the present invention showing the left side main frame extending between the head pipe and the center frame and supporting the engine.

As shown in FIG. 1, a pair of left and right front forks 3 axially support the front wheel 2 of the motorcycle (vehicle) 1. The pair of front forks 3 is pivotally supported on the head pipe 6 of the vehicle frame 5 to allow steering via the steering stem 4. The pair of left and right main frames 7 extends obliquely downward and rearward from the head pipe 6. The rear ends of the main frames 7 respectively connect to the upper forward side of the pair of left and right center frames (swing arm pivot section) 8. The vehicle frame 5 described herein is made of aluminum and includes the head pipe 6, each main frame 7, and each center frame 8.

The base end of the swing arm 11 is supported for swivel movement by way of the pivot shaft 9 in the center frame 8. The rear wheel 12 is axially supported by the tip of the swing arm 11. A rear shock absorber 13 is installed in the vicinity of the base end of the swing arm 11. One end of the rear shock absorber 13 is attached to the swing arm 11. The other end of the rear shock absorber 13 is successively connected via a link mechanism 14 to a section farther downward than the pivot shaft 9 of center frame 8.

A five cylinder V shaped engine (hereafter simply referred to as "engine") 15 including a crankshaft extending in the direction of the vehicle width, is installed in approximately the center of the chassis. An air cleaner case 16 is installed rearward of the head pipe 6 and above the engine 15. A fuel tank 17 is installed rearward of the air cleaner case 16. The portion of the vehicle above the air cleaner case 16 and the fuel tank 17 is covered by a tank cover 18.

The forward end of the seat frame 19 extends obliquely upward and rearward with respect to the upper rear side of the main frame 7. A driver (rider) seat 21, positioned rearward of the tank cover 18, and a center muffler 42, positioned rearward of that seat 21, are both supported by this seat frame 19. The rearward half of the fuel tank 17 is installed to extend rearwards below the seat 21. This installation position is intended to center the mass and impart a low center-of-gravity to the motorcycle 1. Steps (footrest) 23 are installed on both the left and right on the rear of the center frame 8 for the driver (rider). A muffler stay 24 for supporting a side muffler 41 is installed on the right side of the vehicle on the lower right side of the seat frame 19.

A pair of left and right handle bars 25 is installed on the top end of the front fork 3. A brake caliper 26 is installed on the bottom end of the front fork 3. A brake disc 27 for the brake caliper 26 is installed on the hub of the front wheel 2. The brake caliper 26 and the brake disk 27 substantially comprise the front disc brake of the motorcycle 1. A rear disc brake (not shown in the drawing) is comprised of the same structure as the front disc brake, and is installed on the right side of the rear wheel 12.

The front section of the vehicle of the motorcycle 1 is covered by the front cowl 28. The periphery of the seat frame 19 is covered by the rear cowl 29. Rear sprocket 31 is installed on the left side of the rear wheel 12. A drive sprocket 32 and a drive chain 33 are installed on the rear left side of the engine 15 and the rear sprocket 31. The drive chain 33 is hung around this drive sprocket 32 and transmits the drive power of the engine 15 to the rear wheel 12.

The front part of the engine 15 is supported by an engine hanger 34 installed on the lower section of the main frame 7. The rear part of the engine 15 is supported on the vehicle frame 5 clamped respectively to the upper section and the lower section of the center frame 8. Among the five engine 15 cylinders, three cylinders are installed on the front tilt cylinder section 36 installed forward and above the crankcase 35. The remaining two cylinders are installed on the rear tilt cylinder section 37 installed above and obliquely behind the crankcase 35. The air intake passages 38 extending from the air cleaner case 16 connect to the respective cylinder sections 36, 37 on the side of the cylinder section which faces the other cylinder section. The exhaust pipes 39 connect to each respective cylinder section 36, 37 on the side opposite to that of the intake passage 38 on the cylinder head.

The exhaust pipe 39 extending from the front tilt cylinder section 36 curves downwards and after passing below the crankcase 35, connects to the side muffler 41 on the right side of the vehicle. The exhaust pipe 39 extending from the rear tilt cylinder section 37 extends rearward and connects to the center muffler 42 inside the rear cowl 29. An engine upper stage radiator 43, is installed forward of the front tilt cylinder section 36. Likewise, an engine lower stage radiator 44 is installed forwards of the crankcase 35.

Figure 2:
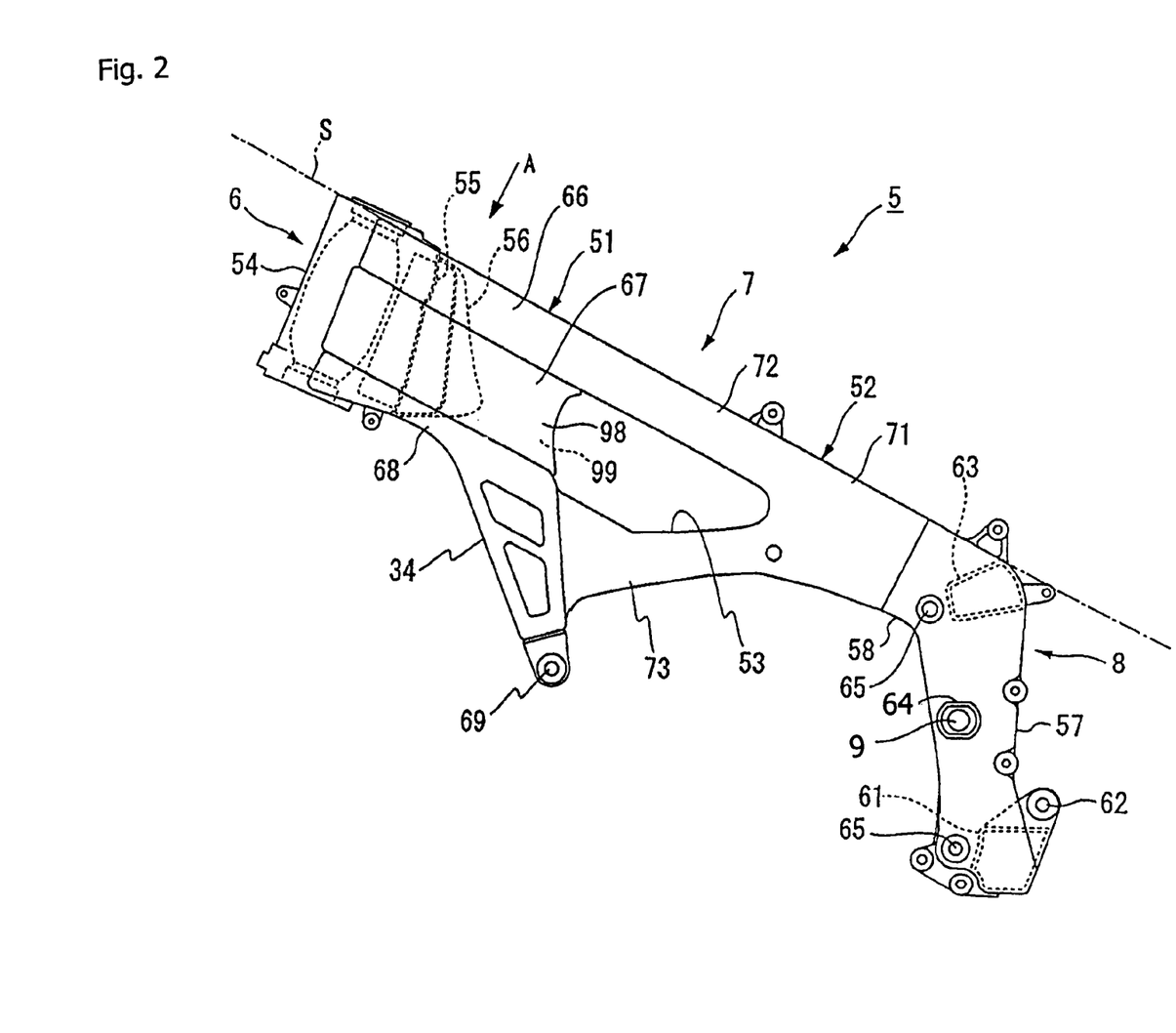
FIG. 2 is an isolated side view of the motorcycle frame showing the left side main frame and center frame.
Figure 3:
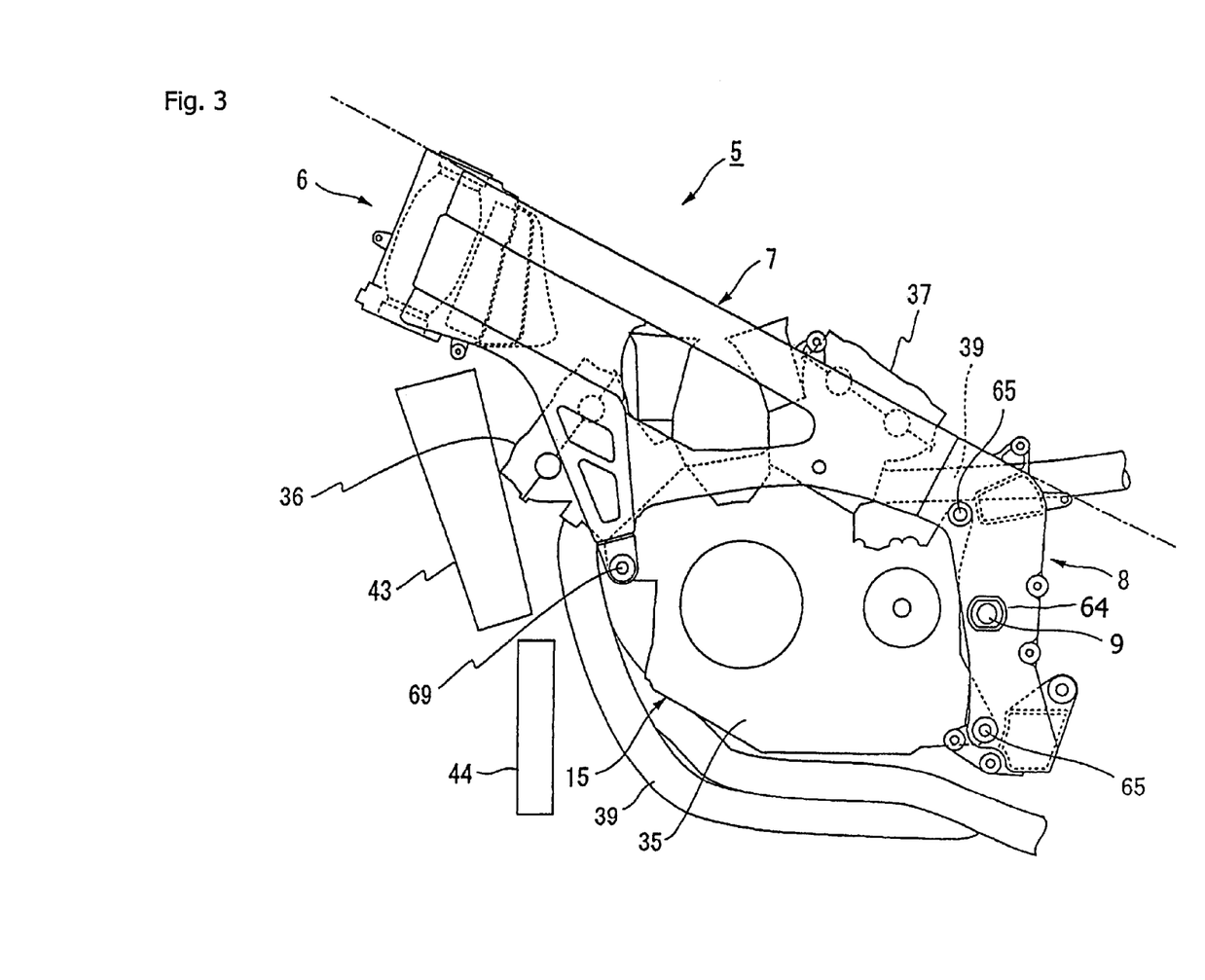
FIG. 3 is an isolated side view of the motorcycle frame of FIG. 2, showing the engine mounted on the frame members.
Figure 4:
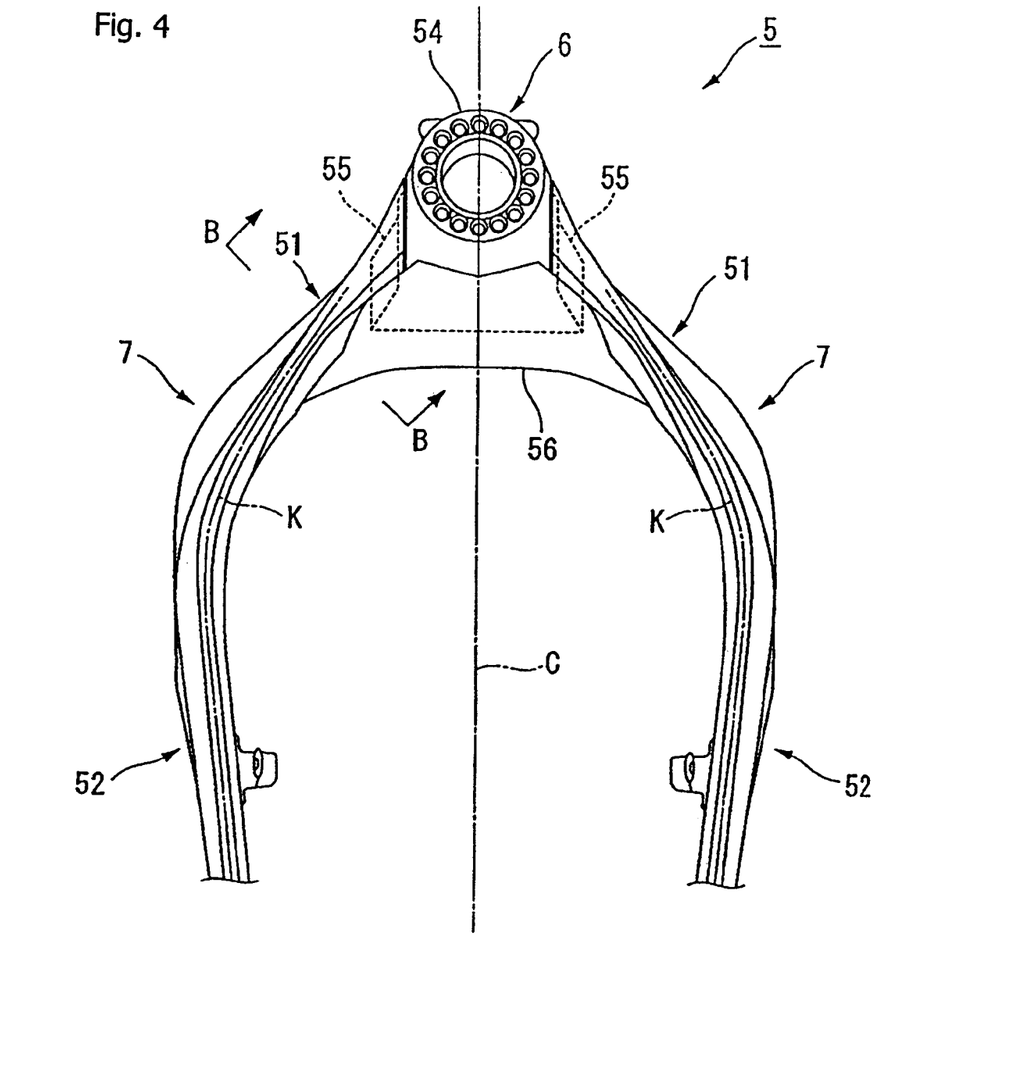
FIG. 4 is a cross sectional view of the vehicle frame as seen from the direction of arrow A in FIG. 2 showing the curvilinear sectional shape symmetric about the vehicle centerline.

Each front half section 51 of each main frame 7 as shown in FIG. 2 and FIG. 3 is formed facing obliquely and rearward from the head pipe 6. As shown in the side view, each front half section 51 of each main frame 7 is formed along the downward tilt flat surface S. The front half sections 51 further extend so as to separate towards the left and right (towards vehicle width) facing rearward from the head pipe 6, as shown by the arrow A shown in FIG. 2 intersecting the tilt flat surface S. The rear half sections 52 of each main frame face obliquely downward in the side view, and are formed along the tilt flat surface S the same as the front half sections 51. These rear half sections 52 also slightly approach each other in the left and right direction as they extend facing rearward as shown in FIG. 4. The C in FIG. 4 indicates the center of the vehicle in the widthwise direction.

The front half sections 51 and rear half sections 52 smoothly connect by way of a gentle bend on the main frame 7 as shown in FIG. 4. Here, the curve K running along each main frame 7 on the tilt flat surface S, is a curved line along the direction that each main frame 7 extends. The rear end of each main frame 7 is connected to the upper front side of the matching center frames 8.

The main frames 7 must be both light-weight and high strength. To accomplish this, the main frames 7 are formed in a hollow, closed, and sealed cross sectional structure that combines aluminum plates (or plates formed of other materials) by press forming into the desired shape. When the direction intersecting the tilt flat surface S is the vertical direction (generally equivalent to up and down) of each main frame 7, and the direction parallel with the oblique flat surfaces and also intersecting the curve K is the lateral direction (equivalent to vehicle inner and outer directions) of each main frame 7, then each main frame 7 is installed so as to limit the vehicle size while maintaining the desired strength. Each main frame 7 comprises an overall long vertical cross section versus the lateral direction.

To obtain an optimum balance of strength in the entire vehicle frame 5, each main frame 7 contains a hole 53 (see FIG. 2) formed along the vehicle width and approximately in the center for boosting the flexibility and shock absorption. The hole 53 is also utilized to supply outer air (ventilation) to the air cleaner case 16.

The head pipe 6 is, for example, an aluminum cast product. A pair of joints 55 matching the main frame 7 are formed on both sides of the head pipe 6 at the rear of the pipe piece 54 (see FIGS. 2 and 6). Each main frame 7 is joined (welded) with the head pipe 6 by welding. In this process, the front edge of the main frame 7 is mated (joined) with the joint 55 corresponding to the head pipe 6. A gusset 56 is installed so as to extend over the front end of each main frame 7. The gusset 56 is connected by consecutive welding to the head pipe 6 and the each main frame 7 to form one piece. The joint strength of the parts is in this way boosted and the strength around the head pipe 6 of vehicle frame 5 is also increased.

The center frame 8 is, for example, an aluminum cast product the same as the head pipe 6. The center frame 8 includes a pivot plate 57 formed in a longitudinal plate shape extending vertically. An extension piece 58 extends obliquely upwards and forwards from the upper end of the pivot plate 57 so as to connect to the rear end of the main frame 7. Each center frame 8 and main frame 7 are integrated into one piece. This integration is achieved, for example, by pressing the intersecting surfaces of tip of the extension piece 58 and rear end of the main frame 7 together in their extension direction, and also by welding them along their entire circumference.

A lower cross member 61 is provided on the bottom end of the center frame 8, and extends in vehicle width direction so as to extend between left and right side center frames 8. A coupling 62 and the link device 14 connected to one end of the rear shock absorber 13, are installed on the lower cross member 61. An upper cross member 63, extending in vehicle width direction so as to extend between left and right side center frames 8, is installed on upper sections of the center frames 8. The upper cross member 63 permits adjustment of the strength of the vehicle frame 5, and is both compact and light in weight compared to the lower cross member 61 linked to the rear shock absorber member 13. A support section 64 is provided for the pivot shaft 9. A mount piece 65 is provided for the rear side of the engine 15.

The portion from the front edge of each main frame 7 to the front edge of the opening 53 is the front half section 51. The portion rearward of the front half section 51 is the rear half section 52. The front half section 51 of each main frame 7 is therefore comprised of a frame upper stage (first pipe) 66, a frame midsection 67, and a frame lower stage (second pipe) 68, all forming one integrated piece. The frame upper stage 66 and lower stage 68 are compartmentalized along the direction that the front half section 51 extends. The rear end of the frame midsection 67 forms the front end of the opening 53. The portion on the lower rear side of the frame lower stage 68 forms the engine hanger 34, and extends in a taper becoming more narrow as it proceeds downward as seen in the side view. The front side engine mount 69 is formed at the apex of the taper.

On the other hand, the rear half section 52 of each main frame 7 includes a rear half frame base section 71 which connects to the extension piece 58 of center frame 8, a rear half frame upper stage 72 which extends from the upper front edge of the rear half frame base section 71 along the extension of the main frame 7, and a rear half frame lower stage section 73 extending roughly forwards from the front edge lower section of the rear half base section 71. In other words, the rear half section 52 of each main frame 7 is installed to branch into a portion made up of a rear half frame upper stage 72 and a rear half frame lower stage section 73 that are further forward than the rear half frame base section 71. The opening 53 is formed from the portion enclosed by the rear half frame upper stage 72 and a rear half frame lower stage section 73 that branched as described above.

The rear half frame upper stage 72 is formed as one integrated piece to connect to the frame upper stage section 66. The front end of the rear half frame lower stage section 73 is joined with the rear section of the engine hanger 34 and welded across the entire circumference to be joined as one integrated piece with the engine hanger 34. The front portion of the rear half frame lower stage section 73 is formed in a taper shape that widens towards the front as viewed from the side, in order to alleviate the stress concentrated on the portion joined to the engine hanger 34.

The frame upper stage section 66 is consecutively connected to center frame 8 forming one integrated piece with the upper section of the rear half frame base section 71 and the rear half frame upper stage 72. The rear edge of the engine hanger 34 is installed facing roughly vertically, and the rear edge of the frame midsection 67 is installed so as to connect to the rear edge of the engine hanger 34. In other words, the front half section 51 of the main frame 7 is a section farther to the front side than the engine hanger 34 (engine mount 69).

FIG. 3 shows the positional relation between the vehicle frame 5 and the engine 15. As shown in this figure, the portion of the engine 15 on the front side of the base of the front tilt cylinder section 36 connects to the front engine mount 69 of the engine hanger 34. Also, the portion of the engine 15 on the upper and lower sides at the rear of the crankcase 35 is consecutively connected to each of the rear side engine mounts 65, 65 on the upper and rear side of the center frame 8. By connecting to the engine 15 in this way, the frame portion rearward of the engine hanger 34 can be reinforced as needed.

Figure 5:
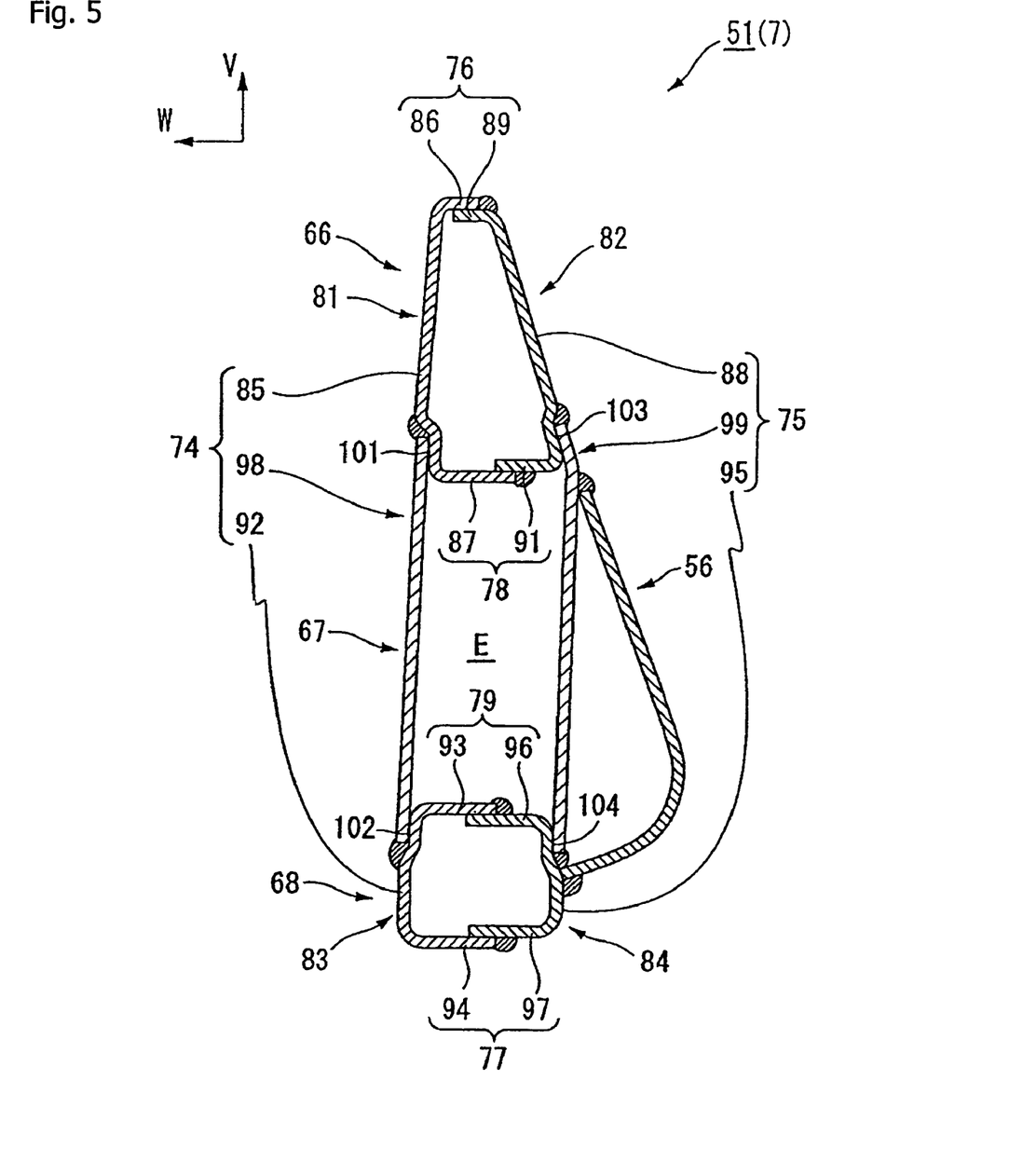
FIG. 5 is a cross sectional view of one main frame taken along line B—B of FIG. 4 showing the closed, sealed, three-layer box cross sectional configuration.

FIG. 5 shows the cross section (cross section along line B—B in FIG. 4) intersecting with the direction that the main frame 7 extends, that is, the direction along the curve K. The arrow mark V in the figure points upward in the vertical direction, and the arrow mark W points laterally to the outer side of the vehicle.

As shown in this figure, the front half section 51 of main frame 7 is formed having a hollow, vertically elongate, closed, and sealed cross sectional shape. This shape is comprised of the frame outer wall (side wall) 74, the frame inner wall (side wall) 75, the frame upper wall 76 and the frame lower wall 77. Moreover, an upper stage reinforcing wall (reinforcing wall) 78 and a lower stage reinforcing wall (reinforcing wall) 79 extend between the interior surfaces of both side walls 74, 75, to form a sealed structure with three-layer box shaped cross section.

An upper stage outer wall portion 81 and an upper stage inner wall portion 82, whose cross sections are U-shaped and open on the right or left side, are combined on the left and right (along vehicle width) to form the frame upper stage section 66 in one piece. This frame upper stage section 66 forms an independent, hollow, closed, and sealed cross sectional structure. In the same way, the frame lower stage section 68 is formed as one piece from a lower stage outer wall portion 83 and a lower stage inner wall portion 84, each having a U-shaped cross section open on the right or left side, combined to form an independent, hollow, closed, and sealed cross sectional structure.

The upper stage outer wall portion 81 includes an upper stage outer side wall 85 for forming the top of the frame outer side wall 74, and an upper stage outer side top wall 86 and an upper stage outer side bottom wall 87 extending laterally from that lower and upper edge of upper stage outer side wall 85 to the side of the frame inner side wall 75. The upper stage inner wall portion 82 includes an upper stage inner side wall 88 for forming the top of the frame inner side wall 75, and an upper stage inner side top wall 89 and upper stage inner side bottom wall 91 extending laterally from that upper edge and lower edge to the side of the frame outer side wall 74.

In the same way, the lower stage outer wall portion 83 includes a lower stage outer side wall 92 forming the bottom of the frame outer side wall 74, and a lower stage outer side bottom wall 94 and lower stage outer side top wall 93 extending laterally from that upper edge and lower edge to the side of the frame inner side wall 75. The lower stage inner wall portion 84 includes a lower stage inner side wall 95 for forming the bottom of the frame inner side wall 75, and a lower stage inner side bottom wall 97 and lower stage inner side top wall 96 extending laterally from that upper edge and lower edge to the side of the frame outer side wall 74.

The upper stage outer wall portion 81 and upper stage inner wall portion 82 are combined so as to fit the upper stage inner side top wall 89 and the upper stage inner side bottom wall 91 between the upper stage outer side top wall 86 and upper stage outer side bottom wall 87. In this state, the upper stage outer side top wall 86 and upper stage inner side top wall 89 are joined by welding along the entire length of the front half section 51. In the same way, the upper stage outer side bottom wall 87 and upper stage inner side bottom wall 91 are joined by welding.

In the same way, the lower stage outer 83 and lower stage inner 84 are combined so as to fit the lower stage inner side bottom wall 97 and lower stage inner side top wall 96 between the lower stage outer side bottom wall 94 and lower stage outer side top wall 93. In this state, the lower stage outer side top wall 93 and lower stage inner side top wall 96 are joined by welding along the entire length of the front half section 51. In the same way, the lower stage outer side bottom wall 94 and lower stage inner side bottom wall 97 are joined by welding.

An outer plate 98 and an inner plate 99 are installed between the frame upper stage section 66 and frame lower stage section 68 so as to extend over both the frame upper stage section 66 and frame lower stage section 68. The plates 98, 99 are installed approximately in parallel along the vertical direction. The frame upper stage section 66 and frame lower stage section 68 are joined together with these plates so as to enclose a space E which extends horizontally between the frame upper stage section 66 and frame lower stage section 68.

An upper stage outer side step 101 is formed at the bottom edge of the upper stage outer side wall 85 of the frame upper stage section 66. The upper stage outer step 101 is shaped to receive and consolidate the upper edge of the outer plate 98. A lower stage outer side step 102 is formed at the upper edge of the lower stage outer side wall 92 of the frame lower stage section 68. The lower stage outer side step 102 is shaped to receive and to consolidate the lower edge of the outer plate 98.

In the same way, an upper stage inner side step 103 is formed on the lower edge of the upper stage inner side wall 88 of the frame upper stage section 66. The upper stage inner side step 103 is shaped to receive and to consolidate the upper edge of the inner plate 99. A lower stage inner side step 104 is formed at the upper edge of the lower stage inner side wall 95 of the frame lower stage section 68. The lower stage inner side step 104 is formed to receive and to consolidate the lower edge of the inner plate 99.

When the upper edge and lower edge of the outer plate 98 are respectively consolidated and positioned by the upper stage outer side step 101 and the lower stage outer side step 102, then the outer plate 98 is joined to these parts by welding across the entire length of the front half section 51. In the same way, the upper edge and lower edge of the inner plate 99 is respectively consolidated and positioned by the upper stage inner side step 103 and lower stage inner side step 104, and then the inner plate 99 is joined to these parts by welding across the entire length of the front half section 51.

The frame midsection 67 forms a closed, sealed cross sectional structure, by means of the plates 98, 99 installed as described, sealing a hollow space E between along the frame upper stage section 66 and the frame lower stage section 68. Restated in other words, the front half section 51 of the main frame 7 is made up of the respective sealed cross sectional structures formed by the vertically stacked frame upper stage section 66, frame midsection 67, and frame lower stage section 68. Though the frame lower stage section 68 has approximately the same proportions horizontally and vertically, the cross sections of the frame upper stage section 66 and frame midsection 67 are longer in the vertical direction.

The frame upper wall 76 of the front half section 51 is formed from the upper stage outer side top wall 86 and the upper stage inner side top wall 89. The frame lower wall 77 is formed from the lower stage outer side bottom wall 94 and lower stage inner side bottom wall 97. The frame outer wall 74 of the front half section 51 is formed from the upper stage outer side wall 85, the outer plate 98, and the lower stage outer side wall 92. The frame inner wall 75 is formed from the upper stage inner side wall 85, the inner plate 99, and the lower stage inner side wall 95. The upper stage reinforcing wall 78 is formed from the upper stage outer side bottom wall 87 and the upper stage inner side bottom wall 91. The lower stage reinforcing wall 79 is formed from the lower stage outer side top wall 93 and lower stage inner side top wall 96.

The upper section (upper stage inner side wall 88) of frame inner side wall 75 of the front half section 51 is installed obliquely toward the vehicle inner side beginning at a position as far on the vehicle outer side as the frame upper wall 76. A gusset 56 expands from the frame inner wall 75 toward the vehicle inner side forming a peak at a portion near the frame lower wall 77. The portion of the gusset 56 nearest to the frame upper wall 76 is installed obliquely at a position as far on the vehicle outer side as the frame upper wall 76 in a manner similar to that of the upper section of frame inner side wall 75. In this way, the capacity of the air cleaner case 16 that overlaps a portion of the vehicle frame 5 is increased and the task of installing it is simplified.

Figure 6:
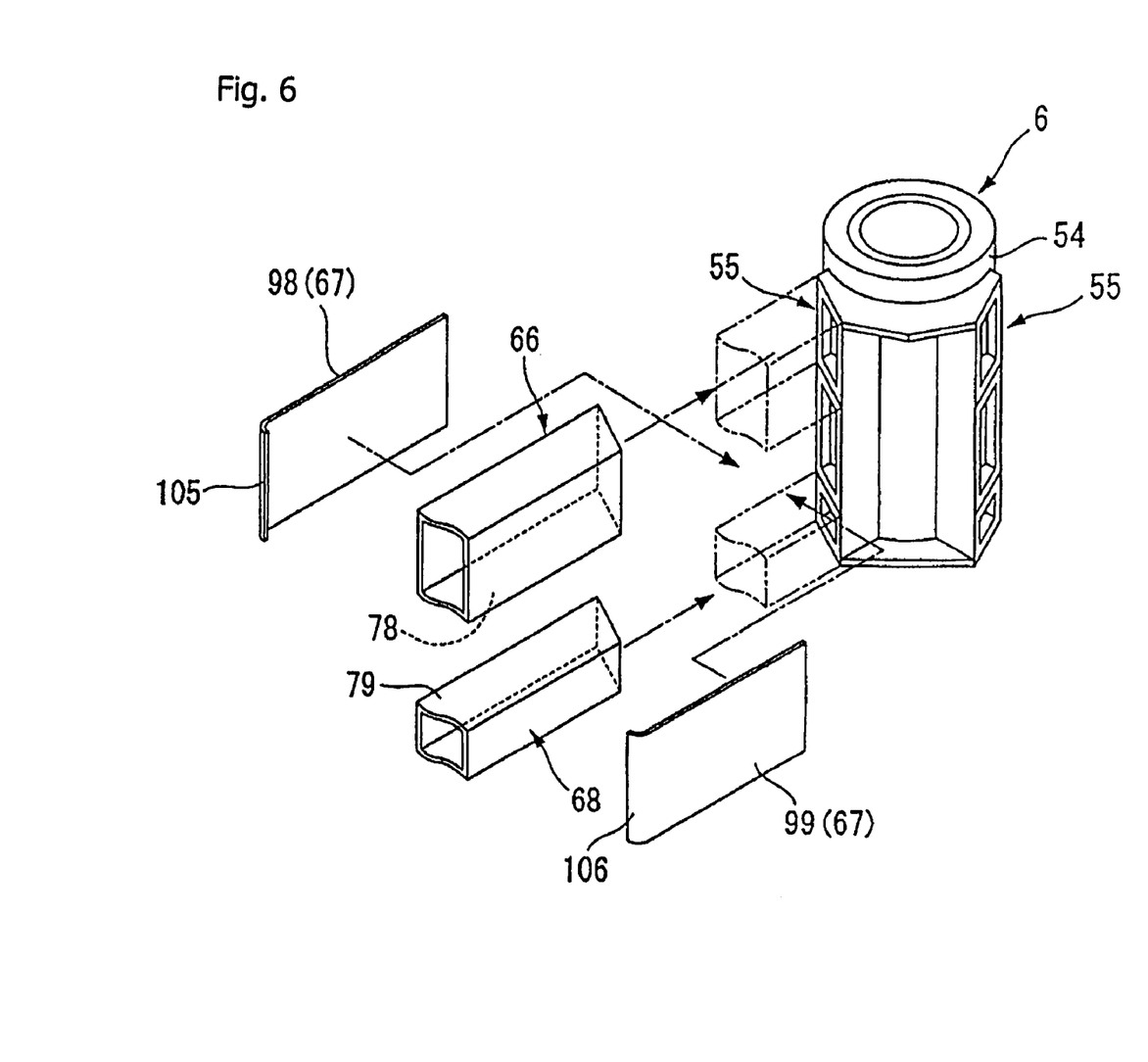
FIG. 6 is an exploded perspective descriptive view showing the joint portion which joins the head pipe and each respective main frame.

Referring now to FIG. 6, both joints 55 are installed on the rear side of head pipe 6 so as to be side by side. Each joint 55 is installed, for example, while joined with the frame upper wall 76 and lower wall 77, frame outer side wall 74 and inner side wall 75, as well as each reinforcing wall 78, 79 that comprise the front half section 51.

Prior to joining both plates 98, 99 to the main frame 7, the first and second pipes are first set in order to join the head pipe 6 and the main frame 7. In other words, the front edges of the lower stage 68 and upper stage 66 with the frame already made a sealed cross sectional structure, are mated to the joint 55. The frame lower stage 68 and frame upper stage 66 are then joined by welding to the joint 55 along their entire circumference.

After joining the frame upper stage 66 and lower stage 68 and the joint 55, both of the plates 98, 99 are installed to seal a space L between these parts. Along with joining their upper and lower edges to the frame upper stage 66 and frame lower stage 68 by welding along their entire length; the front edges of both plates 98, 99 mated to the joint 55, are welded along their entire length to the joint 55. In this way, the coupling of the front half section 51, with its three-layer box shape cross section, to the head pipe 6 is completed.

The front half section 51 is in this state joined to the head pipe 6 along the entire circumference of its leading edge. The reinforcing walls 78 and 79 within the front half section 51 are also joined to the head pipe 6.

An outer flange 105, curved at one end to extend toward the inner plate 99 side, is installed on the rear edge of the outer plate 98. An inner flange 106, curved at one end to extend toward the outer plate 98 side, is installed on the inner plate 99. The flanges 105, 106 are, for example, installed while mutually joined. The rear edge of the frame midsection 67 is sealed by joining these flanges by welding across the entire length of the rear edges of the plates 98, 99.

The vehicle frame structure of the embodiment as described above, extends rearward from the head pipe 6, which supportingly allows steering of the front wheel 2, to the left/right pair of main frames 7. In the vehicle frame structure, at least a section of each main frame 7 is an overall closed, sealed cross sectional structure. At least a section of each main frame 7 is comprised of a frame upper stage section 66 and frame lower stage section 68 each as a sealed cross sectional structure and, an outer plate 98 and an inner plate 99 integrated as one piece and installed on both sides of the frame upper stage section 66 and frame lower stage section 68 so as to extend over the frame upper stage section 66 and frame lower stage section 68.

In this structure, the frame upper stage section 66 and frame lower stage section 68 are respectively installed one above the other. The outer plate 98 and the inner plate 99 are respectively installed inside and outside the vehicle frame, so that the portion provided in each frame 7 by the frame upper stage section 66 and frame lower stage section 68 and outer plate 98 and an inner plate 99 is formed into a closed, sealed cross sectional structure by the frame outer side wall 74, the frame inner side wall 75, the frame upper wall 76, and the frame lower wall 77. Furthermore, the upper stage reinforcing wall 78 and the lower stage reinforcing wall 79 are installed in the interior of this section so as to extend between opposed side walls 74, 75.

In other words, the portion formed in each main frame 7 by the frame upper stage section 66 and frame lower stage section 68 and outer plate 98 and an inner plate 99, is a closed, sealed structure with three-layer box shaped cross section including a pair of reinforcing walls 78, 79 extending between the interior surfaces of the side walls 74, 75.

Forming a desired section in each main frame 7 as a closed, sealed cross sectional structure in this way renders the effect that each frame 7 attains a good balance of high strength, and the vehicle performance is improved. Forming each main frame 7 in a closed, sealed structure with a three-layer box shaped cross section that is comparatively long, renders the effect that the strength of the vehicle frame can be maintained while limiting the frame width, and thus the vehicle frame can be made compact.

Furthermore, in the vehicle frame structure, at least the portion joining the head pipe 6 with each frame 7 is a sealed structure with three layer box shaped cross section, moreover the entire circumference and each reinforcing wall 78, 79 of each main frame 7 are joined to the head pipe 6.

When joining, for example by welding, the entire circumference and each reinforcing wall 78, 79 to the head pipe 6 as described herein, first the frame upper stage section 66 and frame lower stage section 68 are joined to the head pipe 6 across their entire circumferences. Then each of the plates 98, 99 are joined to the frame upper stage section 66 and frame lower stage section 68 as well as to the head pipe 6. In other words, the entire circumferences of the frame upper stage section 66 and frame lower stage section 68, as well as the plates 98, 99 are joined by welding to the head pipe 6 as described in the invention.

Along with achieving high strength utilizing a sealed structure with three-layer box shaped cross section for the front half section 51 of each main frame 7, this structure renders the effect of increasing the joint strength of the head pipe 6 with each main frame 7.

The frame upper stage section 66 and frame lower stage section 68 are welded into a pipe shape to match the respective left and right directions of the vehicle. As a result, a greater degree of freedom is obtained for setting the strength of the main frame 7 compared to when forming a desired shape from already existing pipe material, and the manufacturing is simplified.

The frame lower stage section 68 is also utilized as an engine hanger 34, and the rear section of the frame upper stage section 66 is connected to the center frame 8. As a result, the number of parts in the vehicle frame 5 is efficiently reduced, and the weight and cost are also reduced.

The plates 98, 99 are installed in the front half section 51 of the main frame 7 from the head pipe 6 to the front engine mount 69. As a result, the portion more to the front attains a high strength greater than the front engine mount 69 not reinforced by the engine 15. In other words, rendering the effect that a high strength main frame 7 is efficiently attained.

The present invention is not limited to the above embodiment. For example, the frame upper stage section 66 (as well as the rear half frame upper stage 72) and the frame lower stage section 68 may be formed in the desired cross sectional shape by aluminum extruded material or drawing material, etc. The joint 55 of the head pipe 6 may be fit into the cross section of the main frame 7, or may be a structure into which the main frame 7 is inserted. A structure may also be utilized wherein the main frame 7 is joined directly to a head pipe with a pipe shape not containing a joint 55. The center frame 8 may also be integrated into one piece with the main frame 7.

While a working example of the present invention has been described above, the present invention is not limited to the working example, but various design alterations may be carried out without departing from the spirit and scope of the present invention as set forth in the claims.

What is claimed is:

1. A vehicle frame structure comprising:
a head pipe and a pair of main frames, wherein
the pair of main frames extend rearward from the head pipe such that one of the main frames extends on left side of a vehicle, and the other main frame extends on the right side of the vehicle,
each of the pair of main frames comprising a closed, sealed cross sectional structure,
wherein at least a portion of each main frame comprises:
a first pipe and a second pipe, each said pipe having a closed, sealed cross sectional structure, and
a pair of plate members joined to each pipe to extend over said pipes such that one of the plate members extends on one side of the pipes, and the other plate member extends on the opposed side of the pipes, such that an inside plate member extends inside of each main frame, and an outside plate member extends outside of each main frame.

2. The vehicle frame structure according to claim 1, wherein the portion of each main frame is a closed, sealed structure having a three-layer box shaped cross section, including a top wall, a bottom wall, a pair of opposed side walls extending between the top wall and the bottom wall, and a pair of reinforcing walls extending between the opposed side walls.

3. The vehicle frame structure according to claim 2, wherein each reinforcing wall and a total circumference of each main frame are joined to the head pipe.

4. The vehicle frame structure according to claim 1, wherein the first pipe and the second pipe are disposed in vertical alignment, one of the pair of plate members is disposed on an inside surface of the frame, and the other of the pair of plate members is disposed on an outside surface of the frame.

5. The vehicle frame structure according to claim 4, wherein a periphery of each plate member and a total circumference of each pipe are joined to the head pipe by welding.

6. The vehicle frame structure according to claim 4, wherein each pipe is welded in a pipe shape to match the vehicle frame on the left and right sides.

7. The vehicle frame structure according to claim 4, wherein the second pipe also functions as an engine hanger.

8. The vehicle frame structure according to claim 4, further comprising a vehicle swing arm, and a rear portion of the first pipe is connected to a pivot portion of the vehicle swing arm.

9. The vehicle frame structure according to claim 4, wherein each plate member is installed on a front half portion of the main frame so as to extend from the head pipe to an engine mounting portion.

10. The vehicle frame structure according to claim 1 wherein
each of the first pipe and the second pipe is comprised of a first blank and a second blank, each blank being formed into a body having a U-shape cross section such that each blank is open to one side and has upper and lower leg portions, wherein
the first blank is oriented relative to the second blank such that the leg portions of the first blank contact the leg portions of the second blank, and such that the open sides coincide, and wherein the first blank is welded to the second blank so as to form a closed, sealed section.

11. The vehicle frame structure according to claim 1 wherein the portion of each main frame has a hollow, closed, four-sided cross section, the cross section further comprising plural reinforcing walls extending between opposed interior surfaces thereof.

12. A vehicle frame structure comprising:
a head pipe and a pair of main frames, wherein
the pair of main frames extend rearward from the head pipe such that one of the main frames extends on a left side of a vehicle, and the other main frame extends on a right side of the vehicle,
each one of the main frames comprising a closed, sealed cross sectional structure, wherein
at least a portion of each main frame comprises:
a first pipe and a second pipe vertically aligned so as to be spaced apart from each other, each of said pipes having a closed, sealed cross sectional structure,
a first plate member confronting first lateral sides of the first pipe and the second pipe, and
a second plate member confronting second lateral sides of the first pipe and the second pipe, the first plate member and the second plate member being fixed to the respective first and second pipes.

13. The vehicle frame structure of claim 12 wherein a front edge of each main frame has a closed, sealed cross section, the cross section including an upper side, a lower side, opposed sidewalls extending between the upper side and the lower side, a first reinforcing member, and a second reinforcing member, wherein
the first reinforcing member and the second reinforcing member extend between the opposed sidewalls,
the first reinforcing member, the second reinforcing member, the upper side, and the lower side are generally mutually parallel, and
a front edge of each of the main frames is fixed to the head pipe such that the first reinforcing member, the second reinforcing member, the upper side, the lower side, and the opposed sidewalls are each welded to the head pipe.

14. The vehicle frame structure of claim 12 wherein the main frames extend rearward from the head pipe such that the second lateral side of one of the main frames is adjacent to, and spaced apart from, the first lateral side of the other main frame, and a space between the main frames defining an interior space of the vehicle frame structure, and wherein
each of the main frames farther comprises a gusset fixed to the main frame so as to generally confront said plate member on an interior space-side of each main frame.

15. A vehicle frame structure comprising:
a head pipe and a pair of main frames;
wherein
the main frames extend rearwardly from the head pipe such that one of the main frames extends on left side of a vehicle, and the other main frame extends on the right side of the vehicle; and
each of the pair of main frames includes a closed, sealed structure with a three-layer box-shaped cross-section;
wherein at least a portion of each frame comprises:
a upper stage section and a lower stage section, each said section having a closed, sealed cross sectional structure, and
a pair of plate members joined to each said section to extend over said sections such that an inside plate member extends inside of each main frame, and an outside plate member extends outside of each main frame.

16. The vehicle frame according to claim 15, wherein the plate members joined to each said section form a closed, sealed cross sectional structure between the upper stage section and the lower stage section.

17. The vehicle frame according to claim 15, further comprising a gusset disposed behind the head pipe and extending between the main frames.

18. The vertical frame according to claim 17, wherein the upper stage section, the midsection and the lower stage section are vertically stacked.

19. The vehicle frame according to claim 18, wherein vertical cross sections of the upper stage section and the midsection are longer than the vertical cross section of the lower stage section.

20. The vehicle frame according to claim 15, wherein the frame includes an engine mounting portion installed on the lower stage section.

* * * * *